United States Patent [19]

Yamasaki et al.

[11] 4,140,599

[45] Feb. 20, 1979

[54] PROCESS FOR PRODUCING POROUS ALUMINUM ANODE ELEMENT

[75] Inventors: Tadashi Yamasaki, Suzaka; Kentaro Hirata, Kawasaki, both of Japan

[73] Assignee: Fujitsu Limited, Japan

[21] Appl. No.: 882,088

[22] Filed: Mar. 1, 1978

Related U.S. Application Data

[63] Continuation-in-part of Ser. No. 692,351, Jun. 3, 1976.

[30] Foreign Application Priority Data

Jun. 4, 1975 [JP] Japan .................................. 50-67158
Jun. 4, 1975 [JP] Japan .................................. 50-67159

[51] Int. Cl.$^2$ ............................................... C25F 3/04
[52] U.S. Cl. ........................... 204/129.43; 204/129.95; 204/DIG. 9
[58] Field of Search .................... 204/129.43, DIG. 9, 204/129.95

[56] References Cited

U.S. PATENT DOCUMENTS

| | | | |
|---|---|---|---|
| 3,284,326 | 11/1966 | Martin | 204/129.43 X |
| 3,477,929 | 11/1969 | Namikata et al. | 204/129.95 X |
| 3,520,788 | 7/1970 | Paehr | 204/129.43 |
| 3,887,447 | 6/1975 | Sheasby et al. | 204/129.95 X |

Primary Examiner—John H. Mack
Assistant Examiner—D. R. Valentine
Attorney, Agent, or Firm—Staas & Halsey

[57] ABSTRACT

A porous aluminum anode element having an increased effective surface area is prepared by an electrolytic etching process using an etchant solution containing $CrO_4^{--}$ in a higher concentration and a lower current density than those heretofore proposed. Currents of a digital signal type, such as a pulse current, or those of triangular, sawtooth, trapezoidal or staircase waveform, are preferred.

4 Claims, 8 Drawing Figures

PROCESS FOR PRODUCING POROUS ALUMINUM ANODE ELEMENT

RELATED APPLICATION

This application is a continuation-in-part of our application Ser. No. 692,351 filed on June 3, 1976.

FIELD OF INVENTION

The present invention relates to a process for the production of a porous aluminum anode element. More particularly, it relates to an electrolytic etching process for the production of an aluminum anode element having an increased effective surface area suitable for use in aluminum solid and electrolytic capacitors of a small size.

STATE OF PRIOR ART

In the manufacture of the above-mentioned capacitors an aluminum plate or rod to be used as an anode element is normally etched electrolytically in an aqueous solution containing halide ion ($Cl^-$) to make its surface porous. The anode element so etched is then anodically oxidized to form thereon an oxide film which will function as dielectrics in the eventual capacitor. On the oxide film a layer of manganese dioxide is then applied which will act as a cathode of the capacitor. On the cathode, layers of graphite, silver and solder are sequentially applied to facilitate the bonding of a cathode lead to the capacitor.

The etching process is important to provide the anode element of an increased effective surface area so that capacitors of high capacitance yet of small size may be prepared therefrom.

Japanese Patent Publication No. 44(1969)-8187, corresponding to U.S. Pat. No. 3,477,929, to T. Namikata et al, discloses a process for producing a porous aluminum anode element wherein the aluminum is electrolytically etched as the anode in an aqueous solution containing 0.02 to 0.2 mol/l of $Cl^-$ and 0.02 to 0.1 mol/l of $CrO_4^{--}$ by flow of a D.C. pulsating current. With the etchant solution disclosed therein, the deepness of pits which contributes to enlargement of the surface area in terms of magnification of etching may be on the order of about 100 to 150 microns. It is emphasized in the above-mentioned patent that if the $CrO_4^{--}$ concentration exceeds 0.1 mol/l of $CrO_4^{--}$, the etching or eroding property of the $Cl^-$ is inhibited, and a thick oxide film is formed on the surface of the element by the protective property of the $CrO_4^{--}$, thus preventing etching of the element. It is taught in the above-mentioned patent that the optimum results are obtained when the $CrO_4^{--}$ concentration is 0.05 mol/l for a $Cl^-$ concentration of 0.1 mol/l.

It has been found that the aluminum anode elements etched by the process of the Namikata patent are very suscepitible to the subsequent formation treatment. It is believed that pits formed on the surface of the anode elements are small and thin so that they are partially clogged with the oxide film formed during the subsequent formation treatment, in particular when high formation voltages are used in the treatment, whereby leading to a reduced magnification of etching. High formation voltages are required to form thick oxide film as dielectrics and in turn to obtain capacitors of high rated voltages. Accordingly, it is desired to provide an improved etching process by which larger and thicker pits may be formed on the aluminum anode elements, which pits may well survive the subsequent formation treatment carried out at high formation voltages.

SUMMARY OF INVENTION

It has been unexpectedly found that, when the electrolytic etching process is carried out by using higher concentrations of $CrO_4^{--}$ and lower current densities than those used in the process described in the Namikata patent, larger and thicker pits may be successfully formed, which may well survive high formation voltages and lead to higher values of the magnification of etching.

Thus, in accordance with one aspect of the invention there is provided a process for the production of an aluminum anode element having a porous surface wherein an aluminum substrate is anodically etched in an aqueous solution containing 0.01 to 0.3 mol/l of $Cl^-$ and 0.5 to 3.0 mol/l of $CrO_4^{--}$ at an elevated temperature of 70° C. to 100° C. by flow of a D.C. pulsating current of a current density of 50 to 300 mA/cm$^2$.

It has also been found that the current employed should preferably have such a wave shape that it may provide, in addition to time intervals during which the effective current for etching is caused to flow, non-etching time intervals during which the current flow is stopped or becomes ineffective for etching. Thus, there are provided non-etching time intervals during which any gases, such as hydrogen, and decomposition products formed during the etching intervals as well as the etchant solution, may be removed from the pits. The cutting off or lowering of the current should desirably be so abrupt that the gases may expand instantaneously, while the reapplication or reincreasing of the current should allow the etchant solution to again enter the pits and to come under the etching conditions. For these purposes it has been found that, besides a pulsating current having a pulsation factor of 1.5 to 3.0 as described in the above-mentioned patent, more intermittent pulsating currents of a type of digital signal, rather than analog signal, are suitable and preferred.

Thus, in accordance with another aspect of the invention a process is provided, for the production of an aluminum anode element having a porous surface, wherein an aluminum substrate is anodically etched in an aqueous solution containing 0.01 to 0.3 mol/l of $Cl^-$ and 0.5 to 3.0 mol/l of $CrO_4^{--}$ at an elevated temperature of 70° C. to 100° C. by flow of a D.C. pulsating current of a current density of 50 to 300 mA/cm$^2$, said current being selected from a pulse current having a frequency of 10 to 80 Hz and a duty ratio of 60 to 95%, a pulsating current having a pulsation factor of 1.5 to 3.0 and a current of triangular, sawtooth, trapezoidal or staircase waveform having a frequency of 20 to 200 Hz.

By the term "duty ratio" with respect to a pulse current is meant the ratio of the amount of time during which current flows, to the sum of the amount of time during which current flows and the amount of time during which current ceases to flow.

BRIEF DESCRIPTION OF DRAWINGS

The basic concept, novel features and advantageous results of the invention will be described with reference to the attached drawings in which.

DETAILED DESCRIPTION

Figure 1:
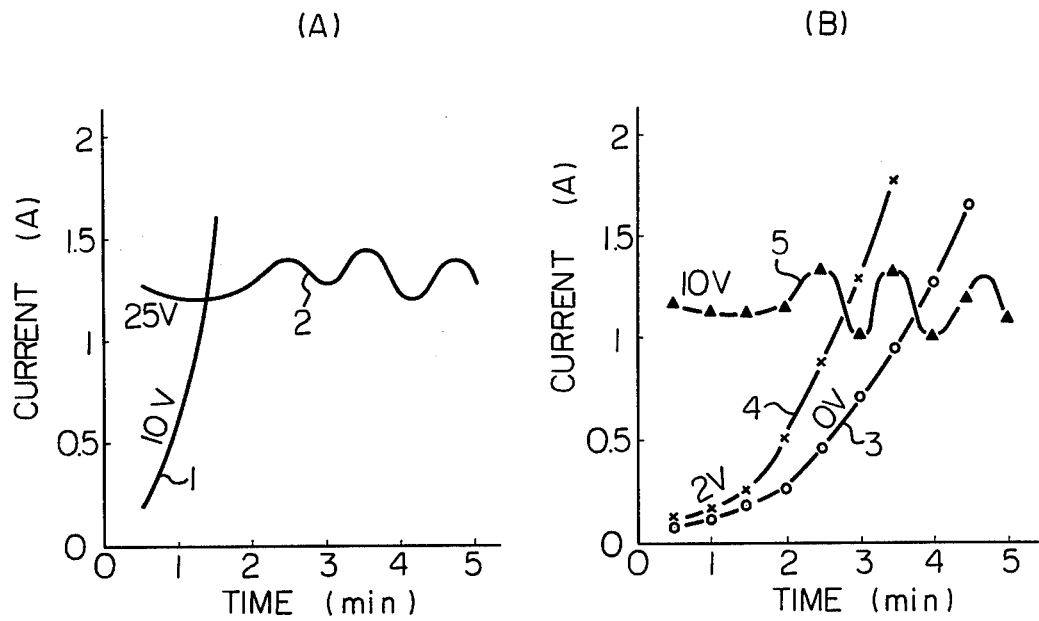
FIGS. 1A and 1B depict the change in the current (A) with time (min.) at the initial stage of the electrolytical etching of a smooth aluminum substrate at the respective constant voltages as indicated, FIG. 1A relating to an etchant solution containing 0.1 mol/l of $Cl^-$ and 0.05 mol/l of $CrO_4^{--}$, while FIG. 1B relates to an ethant solution containing 0.1 mol/l of $Cl^-$ and 1.5 mol/l of $CrO_4^{--}$.

Referring to FIG. 1A, a smooth aluminum substrate having a surface area of 106 mm² was anodically etched in an aqueous solution which contained 0.1 mol/l of $Cl^-$ and 0.05 mol/l of $CrO_4^{--}$, and which is taught as the best solution in U.S. Pat. No. 3,477,929 to Namikata et al, at a temperature of 80° C., using a direct current. The voltage was maintained constant, at 10 V or 25 V. The change in the current (A) with time (min.) was measured during an initial short period of time. The curves in FIG. 1A designated by numerals 1 and 2 represent the results obtained at the constant voltages of 10 V and 25 V, respectively. As noted from the curve 1, the current abruptly increased in the 10 V operation. This was due to the phenomena of pitting corrosion. The current profile observed in the 25 V operation is completely defferent from that observed in the 10 V operation, as seen from the curve 2. This is because etching and re-passivation alternately occurred in the 25 V operation.

FIG. 1B shows results of similar experiments in which the Namikata solution was replaced with an etchant solution in accordance with the invention which contained 0.1 mol/l of $Cl^-$ and 1.5 mol/l of $CrO_4^{--}$. The currents 3, 4 and 5 in FIG. 1B represent the results obtained at the constant voltages of 0 V, 2 V and 10 V, respectively. It will be understood from the curve 5 that the voltage of 10 V is too high to ensure effective pitting corrosion with the etchant solution in accordance with the invention. To ensure effective pitting corrosion with the etchant solution in accordance with the invention (the curves 3 and 4), the process must be started with lower initial voltages. As the process proceeds, the working voltage must be lowered so that the current density is maintained within the range as set forth in the claims.

Figure 2:
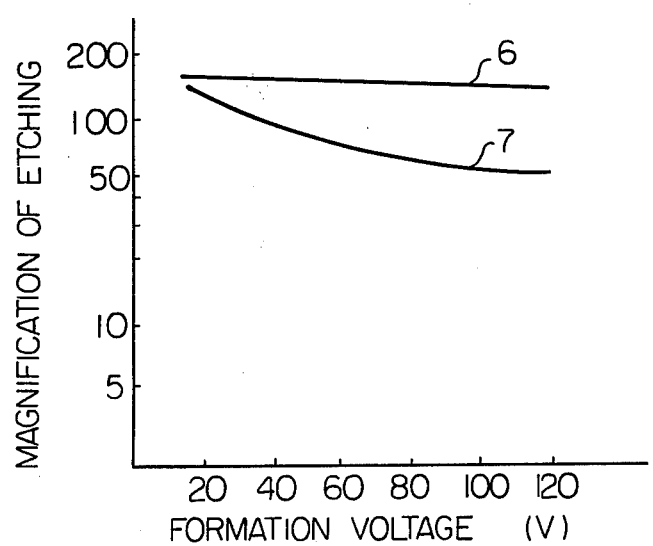
FIG. 2 shows the dependency of the magnification of etching upon the formation voltage.

FIG. 2 depicts the dependency of the magnification of etching upon the formation voltage. Aluminum substrates were anodically etched by the procedure as described in Example 1 below, but using a pulse current having a duty ratio of 70% instead of the duty ratio of 90%. Other aluminum substrates were anodically etched by the procedure as described in Example 1 of the Namikata patent, but using a pulsating current having a pulsation factor of 1.8 instead of the pulsation factor of 1.6. The aluminum anode elements so prepared in accordance with the invention and with the Namikata patent were then formed by anodic oxidation, using boric acid and various formation voltages. The magnification of etching of the products was plotted against the formation voltage. The curves 6 and 7 in FIG. 2 respectively represent the results obtained with the anode elements according to the invention and those obtained with the anode elements according to the Namikata patent.

The curve 7 in FIG. 2 reveals that the prior art products are very suseptible to the subsequent formation treatment. This is because pits formed on the surface of the element in accordance with the prior art are partially clogged with oxides formed during the subsequent formation treatment, in particular when high formation voltages are used in the treatment, leading to a reduced magnification of etching. This is not the case with the products according to the invention, as seen from the curve 6. The products of the invention can be formed at higher formation voltages without suffering from a significant reduction in the magnification of etching, so as to achieve higher rated voltages of small size capacitators made from such products.

Figure 3:
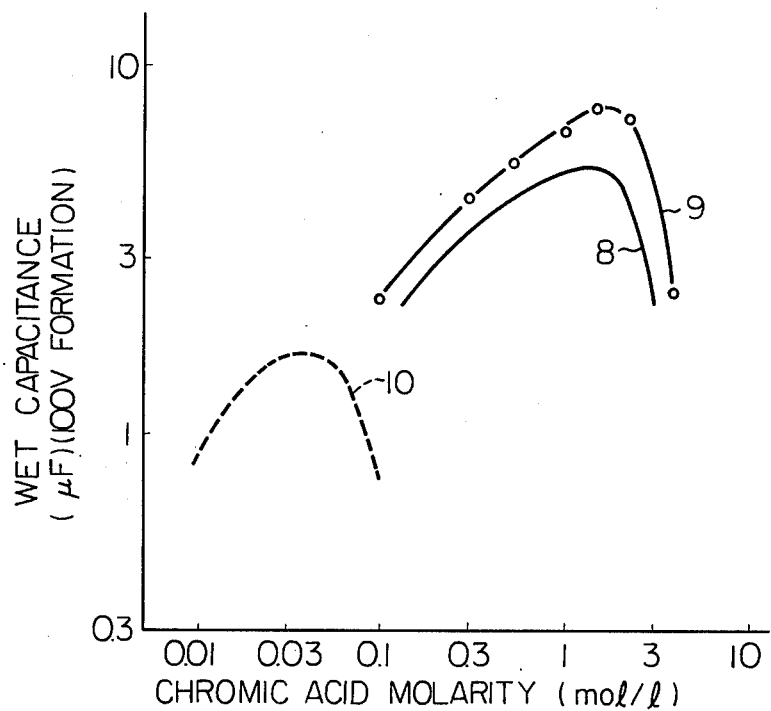
FIG. 3 is a graph showing relationships between the wet capacitance and the chromic acid molarity in various processes.

FIG. 3 is a graph showing relationships between the wet capacitance and the chromic acid molarity in various processes. To obtain the curves in FIG. 3, aluminum substrates having dimensions of 2×3×12 mm were anodically etched in aqueous solutions containing 0.1 mol/l of $Cl^-$ and varied amounts of $CrO_4^{--}$, at a temperature of 80° C. The curves 8 and 9 relate to the processes which were carried out in accordance with the invention by using respectively a rectified pulsating current of single phase full wave having a pulsation factor of 1.8 (curve 8), and a pulse current having a frequency 18 Hz and a duty ratio of 70% (curve 9), with a current density of 100 mA/cm². The curve 10 relates to the prior art process which was carried out by using a rectified pulsating current of single phase full wave having a pulsation factor of 1.8 with a current density of 600 mA/cm². The etched anodes were then anodically oxidised using boric acid and a formation voltage of 100 V.

It can be seen from the curve 10 that in the prior art process the maximum capacitance can be obtained at a chromic acid molarity of about 0.05 mol/l and, as the chromic acid concentration exceeds this value the capacitance begins to decrease drastically. When compared with the results represented by the curve 10, the results shown by the curve 8 are unexpectedly surprising. As seen from the curve 8, by the process in accordance with the invention capacitances as high as about twice or more those obtainable by the prior art process are achieved at chromic acid concentrations which are as high as ten times or more those utilized in the prior art process and at which the prior art process does not effectively operate. The curve 9 depicts the fact that a pulse current is preferred to a rectified pulsating current of single phase full wave in carrying out the process of the invention.

Figure 4:
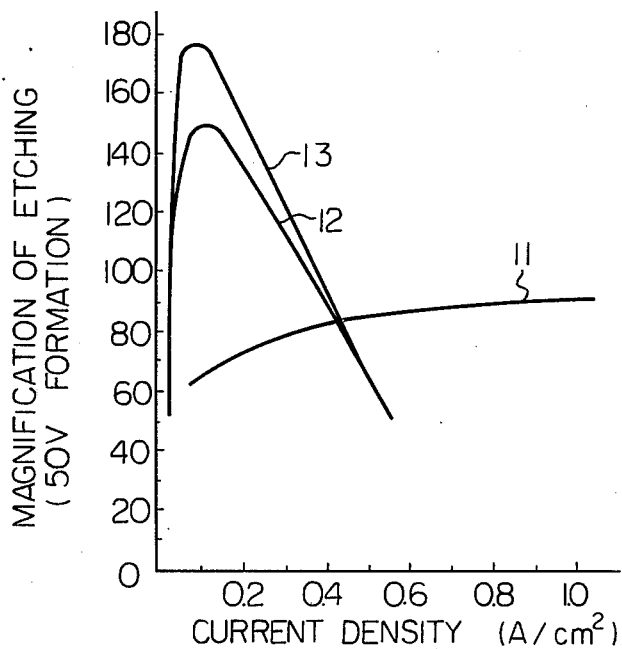
FIG. 4 is a graph showing relationships between the magnification of etching and the current density in various processes.

FIG. 4 is a graph showing relationships between the magnification of eching and the current density in various processes. The curve 11 relates to a process in accordance with the Namikata patent wherein respective aluminum substrates were anodically etched in respective aqueous solutions each containing 0.1 mol/l of $Cl^-$ and 0.05 mol/l of $CrO_4^{--}$, at a temperature of 80° C., using a rectified pulsating current of single phase full wave having a pulsation factor of 1.8 with various current densities. The curve 12 relates to a process in accordance with the invention wherein respective aluminum substrates were anodically etched in respective aqueous solutions each containing 0.1 mol/l of $Cl^-$ and 0.05 mol/l of $CrO_4^{--}$, at a temperature of 80° C., using a rectified pulsating current of single phase full wave having a pulsation factor of 1.8 with various current densities. The curve 13 relates to a process in accordance with the invention wherein respective aluminum substrates were anodically etched in respective aqueous, solution each containing 0.1 mol/l of $Cl^-$ and 1.5 mol/l of $CrO_4^{--}$, at a temperature of 80° C., using a pulse current having a frequency of 18 Hz and a duty ratio of 70% with various current densties. In each run, the etching was carried out for a period of time which ensured the best possible results with the particular current density concerned. Generally, the lower the current density the longer the time period was required to obtain the best possible resutls. The anode elements so etched were then formed by anodic oxidation, using boric acid and a formation voltage of 50 V.

The curve 11 reveals that in the prior art process, which was carried out at a $CrO_4^{--}$ concentration as low as 0.05 mol/l, the attainable magnification of etching tends to decrease, as the current density is lowered, and does not considerably increase even if higher current densities are used. In other words, the current density is not very critical in the prior art process. When compared to the results shown by the curve 11, the results represented by the curve 12 are suprisingly unexpected. It is revealed from the curve 12 that in the illustrated process, which was carried out in accordance with the invention at a $CrO_4$ concentration as high as 30 times that recommended by the prior art, the current density is strictly critical. In fact, if current densities as high as 0.6 to 0.7 $A/cm^2$ as specifically used by Namikata et al, are used in the process of the invention, no useful results are obtainable. Furthermore, it has been found that current densities substantially higher than 0.3 $A/cm^2$ (300 $mA/cm^2$) provide unreliable and less reproducible results. For this reason and from the results represented by the curves 12 and 13, we have selected current densities ranging from 0.05 to 0.3 $A/cm^2$ (50 to 300 $mA/cm^2$) in combination with the selected range of the chromic acid concentration. The curve 13 depicts the fact that a pulse current is preferred to a rectified pulsating current of single phase full wave in carrying out the process of the invention.

Figure 5:
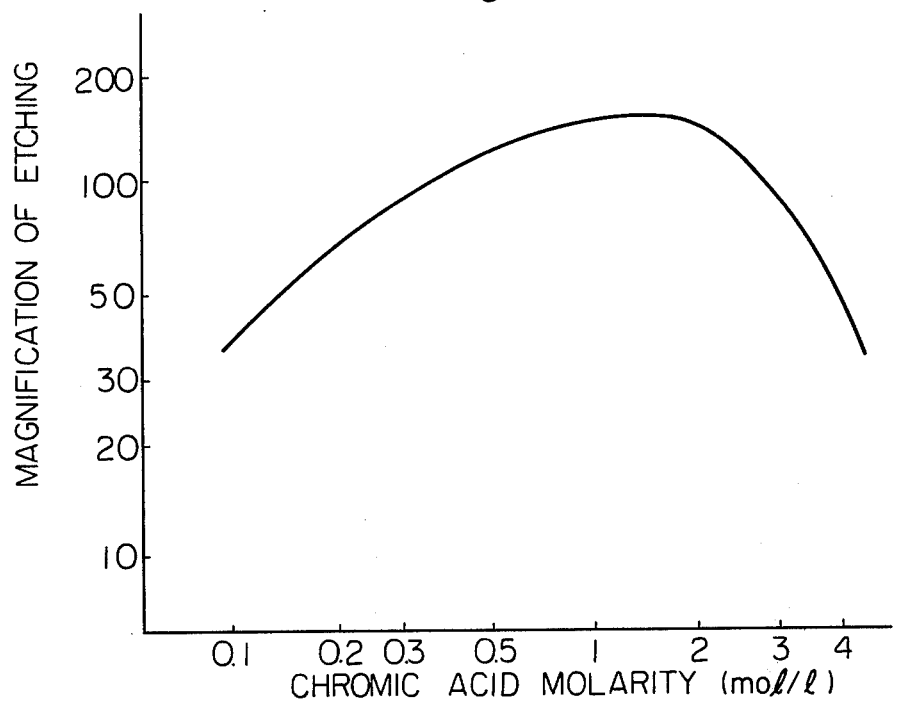
FIG. 5 is a graph obtained by plotting the magnification of etching against the chromic acid concentration in the process of the invention.

The curve shown in FIG. 5 was obtained from the data which the curve 9 in FIG. 3 was based on and derived from. From the results represented by the curves shown in FIGS. 3 and 5, we have selected chromic acid concentrations ranging from 0.5 to 3.0 mol/l. Furthermore, it has been found that with chromic acid concentrations substantially in excess of 3.0 mol/l the results tend to become unreliable and less reproducible.

Figure 6:
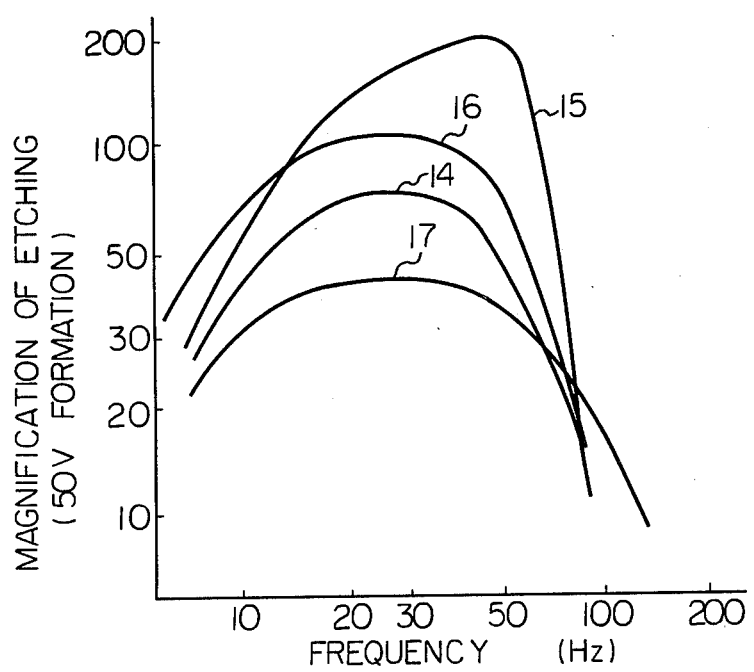
FIG. 6 is a graph showing relationships between the magnification of etching and the pulse frequency of pulse currents having various duty ratios.

The data shown in FIG. 6 were obtained by repeating the general procedure as described in Examples 1 and 2 with pulse currents having varied frequencies and duty ratios. The curves in FIG. 1 designated by numerals 14, 15, 16 and 17 represent the duty ratios of 60%, 70%, 90% and 95%, respectively.

We have found that if the duty ratio is substantially lower than a value of 60%, satisfactorily deep pits are not formed; and that a pulse current having a duty ratio of above 95% resembles a steady current resulting in a low magnification of etching. We have also found that the pulse frequency also affects the etching performance. Frequencies of less than about 10 Hz produce only shallow and thin pits while those of more than about 80 Hz lead to uniform etching. Frequencies outside the range of from about 10 to about 80 Hz result in reduced magnifications of etching as seen from FIG. 6.

Figure 7:
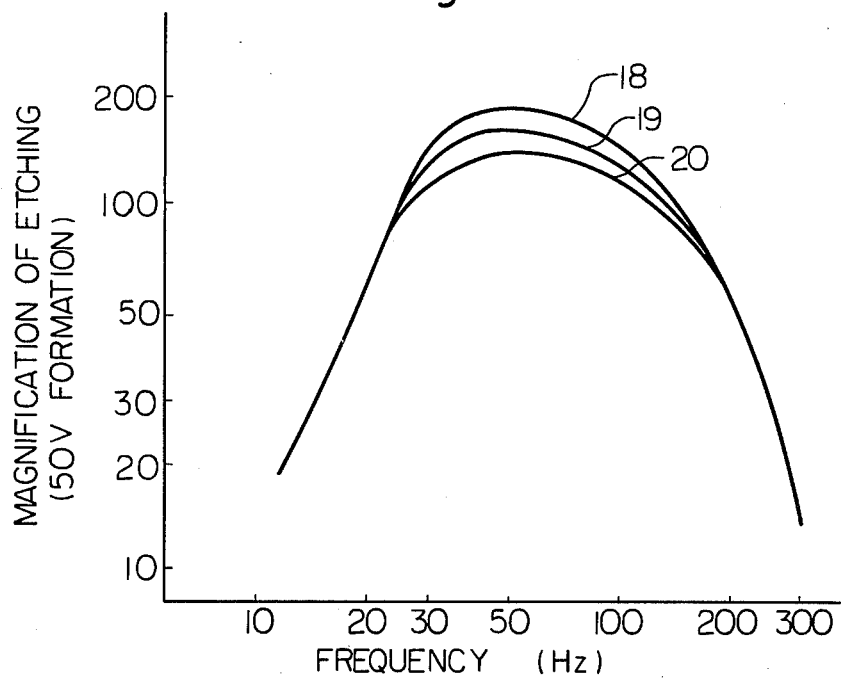
FIG. 7 is a graph showing relationships between the magnification of etching between the frequency of respective currents of triangular, sawtooth, trapezoidal and staircase waveforms.

The data shown in FIG. 7 were obtained by repeating the general procedure as described in Example 7 with currents having various frequencies. The curves in FIG. 7 designated by numerals 18, 19 and 20 represent currents of triangular, sawtooth and trapezoidal (or staircase) waveforms, respectively. We have found that frequencies of less than about 20 Hz produces shallow pits of a relatively large diameter, while frequencies of more than about 200 Hz result in uniform etching.

Figure 8:
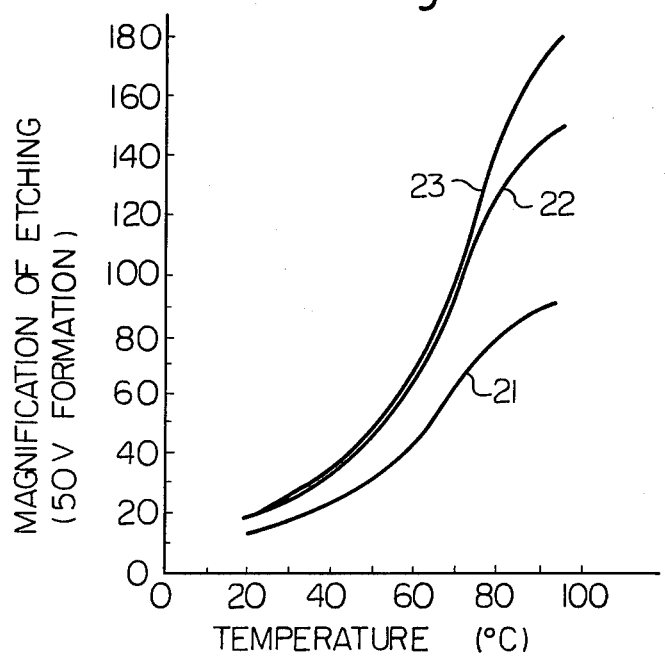
FIG. 8 is a graph showing relationships between the magnification of etching and the temperature in various processes.

FIG. 8 illustrates the dependency of the magnification of etching upon the temperature in various processes. The data shown by the curves 21, 22 and 23 were respectively obtained by repeating the general procedures as described hereinabove with reference to the respective curves 11, 12 and 13 except that the current density was set 600 $mA/cm^2$ for obtaining the curve 21 and 100 $mA/cm^2$ for obtaining the curves 22 and 23 and that the temperature was varied.

It is revealed from the data shown in FIG. 8 that the etching process should be carried out at elevated temperatues of at least about 70° C. so as to obtain useful results. Temperatures in excess of about 100° C. are inconvenient because the aqueous echant solution boils.

The invention will be further described by means of the following Examples.

EXAMPLE 1

A smooth aluminum substrate of a purity of 99.99% having dimensions of 2×3×10 mm (thickness-width-length) was electrolytically etched for 60 minutes in an aqueous solution containing 0.1 mol/l of HCl and 1.5 mol/l of $CrO_3$, at a temperature of 80° C., using a pulse current having a source frequency of 18 Hz and a duty ratio of 90%, with a current density of 100 $mA/cm^2$. The plate so etched was then formed by anodic oxidation, using boric acid and a formation voltage of 50 V.

The anode element so prepared had a wet capacitance of 28.8 $\mu f/cm^2$ which was 120 times as great as that of the smooth aluminum plate.

EXAMPLE 2

The procedure as described in Example 1 was repeated except that a current density of 55 $mA/cm^2$ was used instead of the current density of 100 $mA/cm^2$.

The anode element prepared had a wet capacitance of 24 $\mu f/cm^2$, revealing the magnification of etching of 100.

Comparative Example

Another piece of the same aluminum plate as processed in Example 1 was electrically etched for 10 minutes in an aqueous solution containing 0.1 mol/l of HCl and 0.05 mol/l of $CrO_3$, at 80° C., using a regulated pulsating current of a single phase full wave having a pulsation factor of 1.6, with a current density of 600 $mA/cm^2$. The plate was then formed in the same manner as described in Example 1.

The anode element so prepared had a wet capacitance of 19 $\mu f/cm^2$, revealing the magnification of etching of only 80.

EXAMPLE 3

The procedure as described in Example 1 was repeated except that the pulse current used in Example 1 was replaced with a pulse current having a duty ratio of 70% and a frequency of 50 Hz, with other conditions remaining the same. The product had a wet capacitance of 46 μf/cm², revealing the magnification of etching of 190.

EXAMPLE 4

The procedure as described in Example 3 was repeated except that the concentration of $CrO_3$ was reduced from 1.5 mol/l used in Example 3 to 0.55 mol/l. The product had a wet capacitance of 31.2 μf/cm², which corresponds to the magnification of etching of 130.

EXAMPLE 5

A smooth aluminum plate of a purity of 99.99%, having a thickness of 2 mm, a width of 3 mm and a length of 10 mm, was electrolytically etched for 20 minutes in an aqueous solution containing 0.1 mol/l of HCl and 1.0 mol/l of $CrO_3$ at a temperature of 80° C., using a rectified pulsating current of a single phase full wave having a pulsation factor of 2.0, with a current density of 200 mA/cm². The plate so etched was then formed by anodic oxidation using boric acid and a formation voltage of 50 V.

The anode element so prepared had a wet capacitance of 36 μf/cm², which was 150 times as great as that of the smooth aluminum plate.

EXAMPLE 6

The procedure as described in Example 5 was repeated except that a current density of 290 mA/cm² was used instead of the current density of 200 mA/cm².

The anode element prepared had a wet capacitance of 28.8 μf/cm², corresponding to the magnification of etching of 120.

EXAMPLE 7

Each of 4 pieces of the same aluminum plate as processed in Example 5 was electrolytically etched for 60 minutes in an aqueous solution containing 0.1 mol/l of HCl and 1.5 mol/l of $CrO_3$, at a temperature of 80° C., using a direct current of triangular, sawtooth, trapezoidal or staircase waveform having a frequency of 50 Hz, with a current density of 100 mA/cm². The plate was then formed in the same manner as described in Example 5.

Surface properties of the anode elements so prepared are shown in Table I below, together with those of the anode element of the Comparative Example.

Table I

| Type of current | Current density, mA/cm² | Wet capacitance μf/cm² | Magnification of etching |
| --- | --- | --- | --- |
| pulsating current | 600 | 19 | 80 |
| triangular waveform | 100 | 42 | 180 |
| sawtooth waveform | 100 | 40 | 170 |
| trapezoidal waveform | 100 | 38.4 | 160 |
| Staircase waveform | 100 | 38.4 | 160 |

What we claim is:

1. A process for the production of an aluminum anode element having a porous surface wherein an aluminum substrate is anodically etched in an aqueous solution containing 0.01 to 0.3 mol/l of $Cl^-$ and 0.5 to 3.0 mol/l of $CrO_4^{--}$ at an elevated temperature of 70° C. to 100° C. by flow of a D.C. pulsating current of a current density of 50 to 300 mA/cm².

2. A process in accordance with claim 1 wherein the current is selected from a pulse current having a frequency of 10 to 80 Hz and a duty ratio of 60 to 95%, a pulsating current having a pulsation factor of 1.5 to 3.0 and a current of triangular, sawtooth, trapezoidal or staircase waveform having a frequency of 20 to 200 Hz.

3. A process in accordance with claim 1 wherein said process is carried out using a pulse current having a frequency of 10 to 80 Hz and a duty ratio of 60 to 95%.

4. A process in accordance with claim 1 wherein said process is carried out using a current of triangular, sawtooth, trapezoidal or staircase waveform having a frequency of 20 to 200 Hz.

* * * * *

UNITED STATES PATENT AND TRADEMARK OFFICE
CERTIFICATE OF CORRECTION

PATENT NO. : 4,140,599
DATED : February 20, 1979
INVENTOR(S) : Tadashi Yamasaki et al It is certified that error appears in the above—identified patent and that said Letters Patent are hereby corrected as shown below:

Column 3, line 2, "ethant" should be --etchant--.
Column 3, line 42, "defferent" should be --different--.
Column 4, line 14, "suseptible" should be --susceptible--.
Column 4, line 64, "eching" should be --etching--.
Column 5, line 14, after "ous" delete ",".
Column 6, line 31, "echant" should be --etchant--.

Signed and Sealed this

Twenty-ninth Day of May 1979

[SEAL]

Attest:

RUTH C. MASON
Attesting Officer

DONALD W. BANNER
Commissioner of Patents and Trademarks